(12) United States Patent
Jiang et al.

(10) Patent No.: US 12,543,083 B2
(45) Date of Patent: Feb. 3, 2026

(54) NETWORK SWITCHING METHOD AND DEVICE (71) Applicant: VIVO MOBILE COMMUNICATION CO., LTD., Guangdong (CN)

(72) Inventors: Dajie Jiang, Dongguan (CN); Xueming Pan, Dongguan (CN); Peng Sun, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 364 days.

(21) Appl. No.: 18/120,580

(22) Filed: Mar. 13, 2023

(65) Prior Publication Data

US 2023/0224783 A1 Jul. 13, 2023

Related U.S. Application Data (63) Continuation of application No. PCT/CN2021/120880, filed on Sep. 27, 2021.

(30) Foreign Application Priority Data

Sep. 29, 2020 (CN) .......................... 202011051161.5

(51) Int. Cl.
*H04W 36/00* (2009.01)
*H04W 36/14* (2009.01)

(52) U.S. Cl.
CPC ..... *H04W 36/0083* (2013.01); *H04W 36/142* (2023.05)

(58) Field of Classification Search
CPC . H04W 68/02; H04W 52/0212; H04W 72/23; H04W 52/0216; H04W 52/0235; H04W 68/025; H04W 52/0229; H04W 76/27; H04W 76/28; H04W 36/0083; H04W 36/142; H04W 36/0085; H04W 56/0005; H04W 56/0045; H04W 56/0055; H04W 72/20; H04W 76/14; H04W 76/30; H04W 84/06; H04L 5/0037; H04L 5/0053;
(Continued)

(56) References Cited

U.S. PATENT DOCUMENTS 10,917,185 B2 2/2021 Yoon et al.
11,234,180 B2 * 1/2022 Lee ........................ H04W 76/27
11,259,201 B2 2/2022 Chen
(Continued)

FOREIGN PATENT DOCUMENTS

CN 110035567 A 7/2019
CN 110392991 A 10/2019
(Continued)

OTHER PUBLICATIONS

Vivo, "Report of [107#35][NR/DCCA] Remaining aspects of early measurement configuration (vivo)", 3GPP TSG-RAN WG2 Meeting #107bis, Chongqing, China, Oct. 14-18, 2019, R2-1912270.

*Primary Examiner* — Hirdepal Singh
(74) *Attorney, Agent, or Firm* — The Webb Law Firm (57) ABSTRACT A network switching method includes determining, by a terminal device, a second signal corresponding to a second network according to a first signal corresponding to a first network; and measuring, by the terminal device, the second signal. Each of the first signal and the second signal includes at least one of a reference signal or a synchronization signal.

19 Claims, 3 Drawing Sheets (58) Field of Classification Search
CPC ........ H04L 5/0035; Y02D 30/70; H04B 7/01; H04B 7/1851; H04B 7/18552
USPC .................................................. 455/436, 458
See application file for complete search history.

(56) References Cited

U.S. PATENT DOCUMENTS

| | | | |
|---|---|---|---|
| 2019/0363809 A1* | 11/2019 | Yoon | H04W 56/00 |
| 2020/0092763 A1 | 3/2020 | Yerramalli et al. | |
| 2021/0044403 A1* | 2/2021 | Zhang | H04L 5/0053 |
| 2021/0314829 A1 | 10/2021 | Jiang et al. | |
| 2021/0329507 A1 | 10/2021 | Yao et al. | |
| 2023/0135259 A1* | 5/2023 | Kurita | H04B 7/0695 |

FOREIGN PATENT DOCUMENTS

| | | | |
|---|---|---|---|
| CN | 110896555 A | 3/2020 | |
| CN | 111263394 A | 6/2020 | |
| EP | 2117238 A1 | 11/2009 | |
| EP | 3206447 A1 | 8/2017 | |
| EP | 3471296 A1 | 4/2019 | |
| EP | 3520479 B1 | 2/2021 | |
| JP | 2020503823 A | 1/2020 | |
| WO | 2016053426 A1 | 4/2016 | |
| WO | 2020052198 A1 | 3/2020 | |

\* cited by examiner

NETWORK SWITCHING METHOD AND DEVICE

CROSS-REFERENCE TO RELATED APPLICATIONS

This application is a Bypass Continuation application of PCT/CN2021/120880 filed Sep. 27, 2021, and claims priority to Chinese Patent Application No. 202011051161.5 filed Sep. 29, 2020, the disclosures of which are hereby incorporated by reference in their entireties.

BACKGROUND OF THE INVENTION

Field of the Invention

This application relates to the communication field, and in particular, to a network switching method and apparatus, and a device.

Description of Related Art

In a mobile communication system such as a long term evolution (LTE) system or a new radio (NR) system, in a case that user equipment (UE, also referred to as a terminal device, a user terminal, a mobile terminal, or the like) needs to switch from a network to another network, a plurality of synchronization signal and PBCH blocks (SSBs) of a plurality of cells under coverage of the network may need to be measured, which is time-consuming and labor-consuming, thereby affecting network switching efficiency.

SUMMARY OF THE INVENTION

According to a first aspect, provided is a network switching method. The method includes: determining, by a terminal device, a second signal corresponding to a second network according to a first signal corresponding to a first network, where each of the first signal and the second signal includes at least one of a reference signal or a synchronization signal; and measuring, by the terminal device, the second signal.

According to a second aspect, provided is a network switching apparatus, applicable to a terminal device. The apparatus includes: a determining module, configured to determine a second signal corresponding to a second network according to a first signal corresponding to a first network, where each of the first signal and the second signal includes at least one of a reference signal or a synchronization signal; and a measurement module, configured to measure the second signal.

According to a third aspect, provided is a terminal device, including: a processor, a memory, and a program or an instruction stored in the memory and executable on the processor, where when the program or the instruction is executed by the processor, steps of the method according to the first aspect are implemented.

According to a fourth aspect, provided is a non-transitory computer-readable storage medium, storing a program or an instruction, where when the program or the instruction is executed by the processor, steps of the method according to the first aspect are implemented.

According to a fifth aspect, provided is a computer program product, including: a processor, a memory, and a program or an instruction stored in the memory and executable on the processor, where when the program or the instruction is executed by the processor, steps of the method according to the first aspect are implemented.

According to a sixth aspect, provided is a chip, including: a processor and a communication interface, where the communication interface is coupled to the processor, and the processor is configured to execute a program or an instruction of a terminal device, to implement steps of the method according to the first aspect.

BRIEF DESCRIPTION OF THE DRAWINGS

The accompanying drawings described herein are used for providing understanding of this application, and form a part of this application. Exemplary embodiments of this application and description thereof are used for explaining this application, and do not constitute an inappropriate limitation on this application. In the accompanying drawings.

DESCRIPTION OF THE INVENTION

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application fall within the protection scope of this application.

In the specification and claims of this application, terms such as "first" and "second" are used to distinguish similar objects, but are not used to describe a specific sequence or order. It should be understood that the data in such a way are interchangeable in an appropriate case, so that the embodiments of this application can be implemented in a sequence other than the sequence illustrated or described herein. In addition, objects distinguished by "first" and "second" are usually in the same type, and a quantity of the objects is not limited. For example, there may be one or more first objects. Furthermore, in the specification and the claims, "and/or" means at least one of the connected objects, and the character "I" generally indicates an "or" relationship between the associated objects.

It is worth noting that the technologies described in the embodiments of this application are not limited to a long term evolution (LTE)/an LTE-Advanced (LTE-A) system, and may further be applied to other wireless communication systems such as a code division multiple access (CDMA) system, a time division multiple access (TDMA) system, a frequency division multiple access (FDMA) system, an orthogonal frequency division multiple access (OFDMA) system, a single-carrier frequency-division multiple access (SC-FDMA) system, and other systems. In the embodiments of this application, the terms "system" and "network" may usually be used interchangeably, and the described technologies may be applied to the systems and radio technologies mentioned above, and may also be applied to other systems and radio technologies. However, in the following description, a new radio (NR) system is described for an illustrative purpose, and the term NR is used in most of the following description, although these technologies may also be applied to applications other than an NR system application, such as a 6-th generation (6G) communication system.

Figure 1:
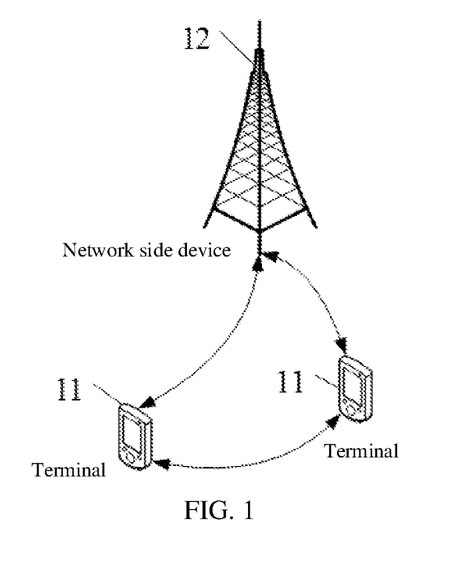
FIG. 1 is a block diagram of a wireless communication system to which an embodiment of this application is applicable.

FIG. 1 is a block diagram of a wireless communication system to which an embodiment of this application is applicable. The wireless communication system includes a terminal 11 and a network side device 12. The terminal 11 may also be referred to as a terminal device or user equipment (UE). The terminal 11 may be a mobile phone, a tablet personal computer, or a laptop computer, or may be referred to as a notebook computer, a personal digital assistant (PDA), a handheld computer, a netbook, an ultra-mobile personal computer (UMPC), a mobile Internet device (MID), or a wearable device, or may be referred to as a terminal side device such as vehicle UE (VUE) or pedestrian UE (PUE), where the wearable device includes a bracelet, an earphone, a pair of glasses, and the like. It should be noted that the type of the terminal 11 is not limited in the embodiments of this application. The network side device 12 may be a base station or a core network, where the base station may be referred to as a node B, an evolved node B, an access point, a base transceiver station (BTS), a radio base station, a radio transceiver, a basic service set (BSS), an extended service set (ESS), a home node B, a home evolved node B, a WLAN access point, a WiFi node, a transmission reception point (TRP), or another appropriate term in the art. As long as the same technical effect is achieved, the base station is not limited to be a specific technical word. It should be noted that in the embodiments of this application, only a base station in the NR system is used as an example, but the type of the base station is not limited.

A network switching method provided in the embodiments of this application is described below with reference to the accompanying drawings and by using embodiments and application scenarios thereof.

Figure 2:
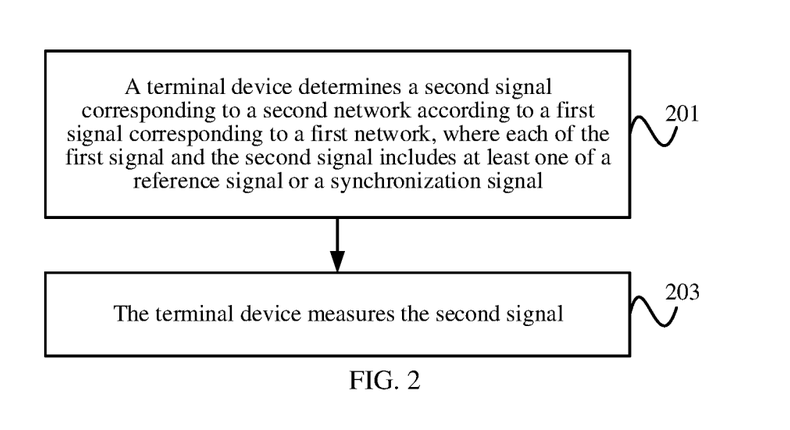
FIG. 2 is a schematic flowchart of a network switching method according to an embodiment of this application.

As shown in FIG. 2, an embodiment of this application provides a network switching method. The method includes the following procedures and steps.

Step 201: A terminal device determines a second signal corresponding to a second network according to a first signal corresponding to a first network, where each of the first signal and the second signal includes at least one of a reference signal (RS) or a synchronization signal (SS).

Optionally, the first signal or the second signal includes a CSI-RS, a tracking reference signal (TRS), a demodulation reference signal (DMRS), a positioning reference signal (PRS), or another reference signal.

Optionally, the first network is a network on which the terminal device camps before network switching is performed. That is, before step 201, the terminal device camps on the first network.

Optionally, the first signal is a signal with strongest signal quality corresponding to the first network. The signal quality includes at least one of reference signal received power (RSRP), reference signal received quality (RSRQ), a signal-to-noise and interference ratio (SINR), a received signal strength indication (RSSI), or the like.

Optionally, the first network and the second network are associated with each other. That is, at least one of the following conditions is satisfied between the first network and the second network: that geographical areas are completely identical or partially identical; that the geographical areas completely overlap or partially overlap; that coverage areas are completely identical or partially identical; or that the coverage areas completely overlap or partially overlap.

Step 203: The terminal device measures the second signal.

In this embodiment of this application, in a process in which the terminal device switches from the first network to the second network associated with the first network, the terminal device may determine the second signal corresponding to the second network according to the first signal corresponding to the first network, and measure the second signal preferentially, where each of the first signal and the second signal may include at least the reference signal and/or the synchronization signal. In this way, a quantity of to-be-measured signals can be reduced and a measurement time can be shortened, thereby completing the switching from the first network to the second network more quickly and improving the network switching efficiency.

Figure 3:
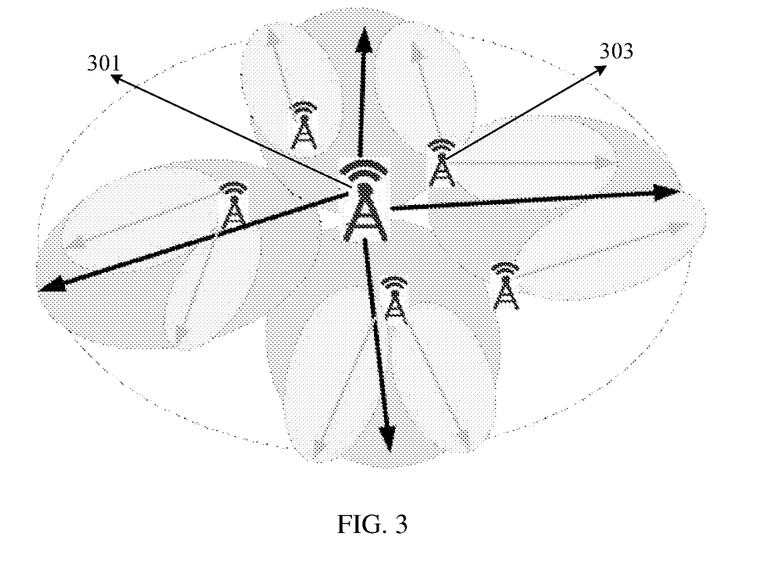
FIG. 3 is a schematic diagram of composition of a network switching architecture according to an embodiment of this application.

Optionally, in the network switching method in this embodiment of this application, a coverage range of the first network is wider than a coverage range of the second network. In an example, FIG. 3 shows the first network deployed and formed by using 1 first-type node (macro base station) 301 and the second network deployed and formed by using 5 second-type nodes (small base stations) 303, where the first network includes 4 synchronization signal and PBCH blocks (SSBs) and the second network includes 8 SSBs in total.

Optionally, in the network switching method in this embodiment of this application, the first network is a control layer network or a sensing layer network, and the second network is a data layer network or a transport layer network.

Optionally, the network switching method in this embodiment of this application may further include at least one of the following.

(1). The terminal device switches or reselects from the first network to the second network, and completes downlink synchronization corresponding to the second network. It may be understood as that the terminal device completes the downlink synchronization corresponding to the second network while measuring the second signal.

(2). The terminal device switches or reselects from the first network to the second network, and completes at least one of system message reading or broadcast message reading corresponding to the second network. It may be understood as that the terminal device completes system message reading and/or broadcast message reading corresponding to the second network after measuring the second signal.

Optionally, in the network switching method in this embodiment of this application, in a case that there are a plurality of first signals corresponding to the first network, step 203 may be performed as the following content:

The terminal device measures an intersection set or a union set of a plurality of second signals corresponding to the plurality of first signals, where the plurality of second signals are determined based on the plurality of first signals corresponding to the first network.

Optionally, the network switching method in this embodiment of this application may be applicable to different scenarios, to implement switching between networks that respectively satisfy different conditions, including but not limited to one of the following.

(1). In a case that the first network is a network satisfying the first condition, the second network is a network satisfying the second condition. That is, in this embodiment of this application, switching or reselecting from the network satisfying the first condition to the network satisfying the second condition may be implemented.

(2). In a case that the first network is a network satisfying the second condition, the second network is a network satisfying the first condition. That is, in this embodiment of this application, switching back or reselecting back from the network satisfying the second condition to the network satisfying the first condition may be implemented.

Optionally, the first condition includes at least one of: using single-frequency network SFN transmission, using a first frequency, having a first antenna height, using first downlink transmit power, or being deployed by using a macro base station; and the second condition includes at least one of: using non-SFN transmission, using a second frequency, having a second antenna height, using second downlink transmit power, or being deployed by using a small base station or a micro base station. The first frequency is lower than the second frequency, the first antenna height is greater than the second antenna height, and the first downlink transmit power is lower than the second downlink transmit power. Some examples of this embodiment of this application are provided below.

Example 1: The first network uses single-frequency network (SFN) transmission and the second network uses non-SFN transmission, or the first network uses non-SFN transmission and the second network uses single-frequency network transmission. In this example, base stations, TRPs, access points (APs), or antennas that form the first network and the second network may be the same or may be different. A frequency point corresponding to the first network and a frequency point corresponding to the second network may be the same or may be different.

SFN transmission may indicate that: a plurality of cells or a plurality of TRPs transmit the same signals, there is no co-frequency interference between different cells, and the SINR, transmission quality, and a coverage effect can be improved through a plurality of signals. The plurality of cells that form an SFN may share a cellID, that is, a supercellID. The plurality of cells may perform signal transmission in an SFN transmission manner, for example, each cell performs transmission by using a wide beam. At a certain moment, the terminal device may receive the wide beams transmitted by the plurality of cells, thereby obtaining a diversity gain. In an SFN transmission solution, the terminal device does not need to frequently perform cell re-selection or switching between cells.

Example 2: The first network uses a relatively low frequency and the second network uses a relatively high frequency, or the first network uses a relatively high frequency and the second network uses a relatively low frequency. For example, the frequency point corresponding to the first network is 700 MHz, and the frequency point corresponding to the second network is 4.8 GHz.

Example 3: The first network has a relatively high antenna height and the second network has a relatively low antenna height, or the first network has a relatively low antenna height and the second network has a relatively high antenna height. For example, the base station, the TRP, the AP, or the antenna of the first network is relatively higher than the base station, the TRP, the AP, or the antenna of the second network. For another example, the antenna of the first network is placed on a high-pass balloon, an unmanned aerial vehicle, an airship, or a satellite, and the antenna of the second network is placed on a ground station. For still another example, the antenna of the first network is placed on an iron tower with a height of 100 meters, and the second network is placed on a roof with a height of 10 meters.

Example 4: The first network is deployed by using a macro base station and the second network is deployed by using a small base station or a micro base station, or the first network is deployed by using a small base station or a micro base station and the second network is deployed by using a macro base station.

It should be noted that, in the network switching method in this embodiment of this application, the foregoing different scenarios may be used alone, or two or more scenarios may be used in combination. For example, the first network is a macro base station using an SFN manner with a relatively low frequency, and the second network is a small base station using a non-SFN manner with a relatively high frequency. The switching between the first network and the second network may be extended to switching between more networks, for example, three layers of networks.

Optionally, in the foregoing scenarios in this embodiment of this application, step 201 may be performed as the following content.

Step a: The terminal device determines second information corresponding to the second signal according to first information corresponding to the first signal.

Step b: The terminal device determines the second signal according to the second information.

Each of the first information and the second information includes at least one of: a cell identifier (ID), a transmission reception point TRP ID, synchronization signal and PBCH block SSB related information, CSI reference signal (CSI-RS) related information, transmission configuration indicator (TCI) information, quasi co-location (QCL) information, or terminal device location related information.

Optionally, the terminal device location related information includes terminal device positioning information or terminal device position area information, and may include at least one of longitude and latitude information, height information, angle information, transmission delay information, or the like of the terminal device. The angle information may be angle information of the terminal device relative to a network side device or a fixed reference object.

It may be understood that the foregoing information corresponding to different networks is used to assist effective determining of the second signal that corresponds to the second network and needs to be measured preferentially.

Optionally, in the network switching method in this embodiment of this application, step a may be implemented by using different embodiments, which include but are not limited to the following embodiments.

Embodiment 1

In the embodiment 1, step a may be implemented as the following content: the terminal device acquires the second information from a first mapping table according to the first information, where the first mapping table includes a correspondence between the first information and the second information. That is, the second information corresponding to the second signal may be effectively determined by looking up the mapping table, thereby effectively determining the second signal.

Optionally, the correspondence between the first information and the second information includes a direct correspondence and an indirect correspondence.

In an example, there is a direct correspondence between the first information and the second information, and the first mapping table may include: a correspondence between the cell ID and the SSB related information corresponding to the second network and the SSB related information corresponding to the first network. It may be understood as that, in this example, the first information is presented as the SSB related information, and the second information is presented as the cell ID and the SSB related information. For details, reference may be made to the following table 1.

TABLE 1

| First information | Second information |
|---|---|
| SSB 1 | Cell ID 1, SSB 1 |
| SSB 2 | Cell ID 1, SSB 2; Cell ID 2, SSB 3; |
| SSB 3 | Cell ID 3, SSB 4 |
| SSB 4 | Cell ID 4, SSB 5 |

It should be noted that the first information in the foregoing table 1 may be the CSI-RS related information, DMRS related information, PRS related information, TRS related information, other signal related information, the TCI information, the QCL information, or the like; and the CellID in the second information may be a TRP ID or an APID, and the SSB related information in the second information may also be the CSI-RS related information, the DMRS related information, the PRS related information, the TRS related information, other signal related information, the TCI information, the QCL information, or the like.

In another example, there is a direct correspondence between the first information and the second information, and the foregoing first mapping table may include a correspondence between at least one of the cell ID or the SSB related information corresponding to the second network and the cell ID corresponding to the first network. It may be understood as that, in this example, the first information is presented as the cell ID, and the second information is presented as the cell ID and/or the SSB related information. For details, reference may be made to the following table 2.

TABLE 2

| First information | Second information |
|---|---|
| TRP 1/cell 1 | Cell ID 1, SSB 1; Cell ID 1, SSB 2; Cell ID 2, SSB 1; Cell ID 2, SSB 2; |
| TRP 2/cell 2 | Cell ID 3, SSB 1; Cell ID 3, SSB 2; Cell ID 4, SSB 1; Cell ID 4, SSB 2; |
| TRP 3/cell 3 | Cell ID 5, SSB 1; Cell ID 5, SSB 2; Cell ID 6, SSB 1; Cell ID 6, SSB 2; |
| TRP 4/cell 4 | Cell ID 7, SSB 1; Cell ID 7, SSB 2; Cell ID 7, SSB 3; |

In still another example, there is a direct correspondence between the first information and the second information, and the first mapping table may include a correspondence between at least one of the cell ID or the SSB related information corresponding to the second network and a TRP ID corresponding to the first network. It may be understood as that, in this example, the first information is presented as the TRP ID, and the second information is presented as the cell ID and/or the SSB related information. For details, reference may be made to the following table 2. The second information in the table 2 is presented as the cell ID and the SSB related information.

It should be noted that the CellID in the second information in the foregoing table 2 may be the TRP ID or the APID, and the SSB related information in the second information may also be the CSI-RS related information, the DMRS related information, the PRS related information, the TRS related information, other signal related information, the TCI information, the QCL information, or the like.

In yet another example, there is a direct correspondence between the first information and the second information, and the foregoing first mapping table may include: a correspondence between the SSB related information corresponding to the first network and the terminal device location related information, and a correspondence between the cell ID and the SSB related information corresponding to the second network and the terminal device location related information. It may be understood as that, in this example, the first information is presented as the SSB related information, the second information is presented as the cell ID and the SSB related information, and the first information is associated with the second information through the terminal device location related information. For details, reference may be made to the following table 3.

TABLE 3

| First information | Second information | Terminal device location related information |
|---|---|---|
| SSB 1 | Cell ID 1, SSB 1 | Positioning information X1/Position area Y1 |
| SSB 2 | Cell ID 1, SSB 2 | Positioning information X2/Position area Y2 |
| | Cell ID 2, SSB 3 | Positioning information X3/Position area Y3 |
| SSB 3 | Cell ID 3, SSB 4 | Positioning information X4/Position area Y4 |
| SSB 4 | Cell ID 4, SSB 5 | Positioning information X5/Position area Y5 |

It should be noted that the first information in the foregoing table 3 may be the CSI-RS related information, the DMRS related information, the PRS related information, the related TRS information, other signal related information, the TCI information, the QCL information, or the like, the CellID in the second information may be the TRP ID or an APID, and the SSB related information in the second information may also be the CSI-RS related information, the DMRS related information, the PRS related information, the TRS related information, other signal related information, the TCI information, the QCL information, or the like.

Optionally, in the embodiment 1, before step a, the network switching method may further include the following content: receiving first signaling transmitted by a network side device, where the first signaling carries the first mapping table and includes radio resource control (RRC) signaling or broadcast signaling.

Embodiment 2

In the embodiment 2, step a may be implemented as the following content: the terminal device acquires the second information from a second mapping table according to the terminal device location related information, where the second mapping table includes a correspondence between the second information and the terminal device location related information. That is, the second information corresponding to the second signal may be effectively determined by looking up the mapping table, thereby effectively determining the second signal.

In an example, the second mapping table includes a correspondence between the cell ID and the SSB related information corresponding to the second network and the terminal device location related information. It may be understood as that, in this example, the second information is presented as the cell ID and/or the SSB related information. For details, reference may be made to the following table 4.

Optionally, the terminal device location related information includes terminal device positioning information or terminal device position area information, and may include at least one of longitude and latitude information, height information, angle information, transmission delay information, or the like of the terminal device. The angle information may be angle information of the terminal device relative to a network side device or a fixed reference object.

TABLE 4

| Second information | Terminal device location related information |
|---|---|
| Cell ID 1, SSB 1 | Positioning information X1/Position area Y1 |
| Cell ID 1, SSB 2 | Positioning information X2/Position area Y2 |
| Cell ID 2, SSB 3 | Positioning information X3/Position area Y3 |
| Cell ID 3, SSB 4 | Positioning information X4/Position area Y4 |
| Cell ID 4, SSB 5 | Positioning information X5/Position area Y5 |

It should be noted that the SSB related information in the foregoing table 4 may also be the CSI-RS related information, the DMRS related information, the PRS related information, the TRS related information, other signal related information, the TCI information, the QCL information, or the like. The cell ID may also be referred to as the TRP ID or the AP ID.

Optionally, in the embodiment 2, before step a, the network switching method may further include the following content: receiving second signaling transmitted by the network side device, where the second signaling carries the second mapping table and includes radio resource control signaling or broadcast signaling.

Optionally, in any one of the foregoing embodiments, the SSB related information includes at least one of: a channel raster of an SSB, a sync raster of the SSB; time information of the SSB, such as a period and an offset; sequence related information of the SSB; a quantity of SSBs; an index of the SSB; or time domain resource information of the SSB.

Optionally, in any one of the foregoing embodiments, the CSI-RS related information includes at least one of: a period of a CSI-RS; a duration of the CSI-RS; an offset of the CSI-RS; a code division multiplexing (CDM) type of the CSI-RS; a quantity of ports of the CSI-RS; a mode of the CSI-RS; resource mapping of the CSI-RS; density of the CSI-RS; frequency domain resource information of the CSI-RS; or a type of the CSI-RS.

Optionally, the type of the CSI-RS includes at least one of: a CSI-RS for tracking; a CSI-RS for calculating layer 1 reference signal received power; a CSI-RS for mobility; a zero power CSI-RS; or a non-zero power CSI-RS.

Optionally, in different scenarios of the network switching method in this embodiment of this application, the terminal device may be triggered to measure the second signal based on different trigger conditions.

In a scenario 1, the first network is a network satisfying the first condition, and the second network is a network satisfying the second condition. In this case, step 203 may be implemented as the following content: the terminal device detects whether a first trigger condition is satisfied; and the terminal device measures the second signal in a case that the first trigger condition is satisfied.

The first trigger condition includes at least one of the following.
(1). First switching signaling transmitted by the first network is received by the terminal device, where the first switching signaling is used for indicating switching from the first network to the second network. Optionally, the first switching signaling includes but is not limited to paging signaling.
(2). Signal quality corresponding to the first network and measured by the terminal device is lower than a first signal quality threshold. Optionally, the signal quality may refer to at least one of RSRP, RSRQ, an SINR, an RSSI, or the like.
(3). A channel occupancy rate (COR) corresponding to the first network and measured by the terminal device is higher than a first COR threshold.
(4). A channel occupancy time (COT) corresponding to the first network and measured by the terminal device is higher than a first COT threshold.
(5). A scheduling request (SR) is transmitted by the terminal device.

Optionally, in the scenario 1, the network switching method in this embodiment of this application may further include the following content: measuring, by the terminal device, the at least one of the reference signal or the synchronization signal corresponding to the first network. In this way, the first signal corresponding to the first network may be determined according to the foregoing measurement result. The first signal may be a reference signal and/or a synchronization signal with strongest signal quality, and optionally, may be a reference signal and/or a synchronization signal with strongest signal quality in a historical measurement window or in most recent measurement.

In a scenario 2, the first network is a network satisfying the second condition, and the second network is a network satisfying the first condition. In this case, step 203 may be implemented as the following content: the terminal device detects whether a second trigger condition is satisfied; and the terminal device measures the second signal in a case that the second trigger condition is satisfied.

The second trigger condition includes at least one of the following.
(1). Second switching signaling transmitted by the first network is received by the terminal device, where the second switching signaling is used for indicating switching from the first network to the second network. Optionally, the second switching signaling may include at least RRC signaling.
(2). Signal quality corresponding to the first network (or a neighboring cell of the first network) and measured by the terminal device is lower than a second signal quality threshold. Optionally, the signal quality may refer to at least one of RSRP, RSRQ, an SINR, an RSSI, or the like.

(3). A channel occupancy rate COR corresponding to the first network and measured by the terminal device is higher than a second COR threshold.

(4). A channel occupancy time COT corresponding to the first network and measured by the terminal device is higher than a second COT threshold.

(5). An RRC connection release message transmitted by the first network has being received by the terminal device.

(6). The terminal device switches from a connected state to an idle state or an inactive state.

(7). The signal quality of the first network is higher than signal quality of the second network. Optionally, the signal quality corresponds to at least one of the reference signal or the synchronization signal. The signal quality may refer to at least one of RSRP, RSRQ, an SINR, an RSSI, or the like. Optionally, that the signal quality of the first network is higher than the signal quality of the second network may be understood as that a difference between the signal quality of the first network and the signal quality of the second network is higher than a third signal quality threshold.

It can be learned from the above that in the network switching method in this embodiment of this application, during switching from the first network to the second network, information about the cellID and the SSB of the second network associated with the first network is determined according to information such as the cellID and the SSB of the first network and is measured preferentially, which can shorten the measurement time and reduce a quantity of to-be-measured cells/SSBs, thereby completing the switching from the first network to the second network more quickly.

It should be noted that the network switching method performed by the terminal device and provided in this embodiment of this application may be performed by a network switching apparatus, or may be performed by a control module configured to implement the network switching method in the network switching apparatus. In this embodiment of this application, an example in which the network switching method is performed by the network switching apparatus is used to describe the network switching apparatus provided in the embodiments of this application.

Figure 4:
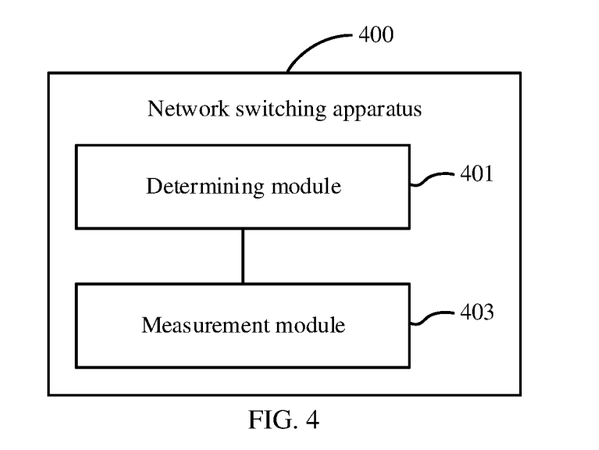
FIG. 4 is a schematic structural diagram of a network switching apparatus according to an embodiment of this application.

Referring to FIG. 4, an embodiment of this application provides a network switching apparatus 400, applicable to a terminal device. The network switching apparatus 400 includes a determining module 401 and a measurement module 403.

The determining module 401 is configured to determine a second signal corresponding to a second network according to a first signal corresponding to a first network, where each of the first signal and the second signal includes at least one of a reference signal or a synchronization signal. The measurement module 403 is configured to measure the second signal.

Optionally, in the network switching apparatus 400 in this embodiment of this application, in a case that the first network is a network satisfying a first condition, the second network is a network satisfying the second condition; or in a case that the first network is a network satisfying the second condition, the second network is a network satisfying the first condition, where the first condition includes at least one of: using single-frequency network SFN transmission, using a first frequency, having a first antenna height, using first downlink transmit power, or being deployed by using a macro base station; and the second condition includes at least one of: using non-SFN transmission, using a second frequency, having a second antenna height, using second downlink transmit power, or being deployed by using a small base station or a micro base station, where the first frequency is lower than the second frequency, the first antenna height is greater than the second antenna height, and the first downlink transmit power is lower than the second downlink transmit power.

Optionally, in the network switching apparatus 400 in this embodiment of this application, the foregoing determining module 401 may include: a first determining unit and a second determining unit.

The first determining unit is configured to determine second information corresponding to the second signal according to first information corresponding to the first signal; and the second determining unit is configured to determine the second signal according to the second information, where each of the first information and the second information includes at least one of: a cell identifier ID, a transmission reception point TRP ID, synchronization signal and PBCH block SSB related information, related channel state information reference signal CSI-RS information, transmission configuration indicator TCI information, quasi co-location QCL information, or terminal device location related information.

Optionally, in the network switching apparatus 400 in this embodiment of this application, the foregoing first determining unit may be configured to acquire the second information from a first mapping table according to the first information, where the first mapping table includes a correspondence between the first information and the second information.

Optionally, in the network switching apparatus 400 in this embodiment of this application, the first mapping table includes one of: a correspondence between the cell ID and the SSB related information corresponding to the second network and the SSB related information corresponding to the first network; a correspondence between the SSB related information corresponding to the first network and the terminal device location related information, and a correspondence between the cell ID and the SSB related information corresponding to the second network and the terminal device location related information; a correspondence between at least one of the cell ID or the SSB related information corresponding to the second network and the cell ID corresponding to the first network; or a correspondence between at least one of the cell ID or the SSB related information corresponding to the second network and the TRP ID corresponding to the first network.

Optionally, the network switching apparatus 400 in this embodiment of this application may further include a first receiving module, configured to receive first signaling transmitted by a network side device before the second information is acquired from the first mapping table according to the first information, where the first signaling carries the first mapping table and includes radio resource control RRC signaling or broadcast signaling.

Optionally, in the network switching apparatus 400 in this embodiment of this application, the foregoing first determining module 401 may be configured to acquire the second information from a second mapping table according to the terminal device location related information, where the second mapping table includes a correspondence between the second information and the terminal device location related information.

Optionally, in the network switching apparatus 400 in this embodiment of this application, the second mapping table includes a correspondence between the cell ID and the SSB related information corresponding to the second network and the terminal device location related information.

Optionally, the network switching apparatus 400 in this embodiment of this application may further include a second receiving module, configured to receive second signaling transmitted by the network side device before the second information is acquired from the second mapping table according to the terminal device location related information, where the second signaling carries the second mapping table and includes radio resource control RRC signaling or broadcast signaling.

Optionally, in the network switching apparatus 400 in this embodiment of this application, the SSB related information includes at least one of: a channel raster of an SSB; a sync raster of the SSB; time information of the SSB; sequence related information of the SSB; a quantity of SSBs; an index of the SSB; or time domain resource information of the SSB.

Optionally, in the network switching apparatus 400 in this embodiment of this application, the CSI-RS related information includes at least one of: a period of a CSI-RS; a duration of the CSI-RS; an offset of the CSI-RS; a code division multiplexing CDM type of the CSI-RS; a quantity of ports of the CSI-RS; a mode of the CSI-RS; resource mapping of the CSI-RS; density of the CSI-RS; frequency domain resource information of the CSI-RS; or a type of the CSI-RS.

Optionally, in the network switching apparatus 400 in this embodiment of this application, the type of the CSI-RS includes at least one of: a CSI-RS for tracking; a CSI-RS for calculating layer 1 reference signal received power; a CSI-RS for mobility; a zero power CSI-RS; or a non-zero power CSI-RS.

Optionally, in the network switching apparatus 400 in this embodiment of this application, the foregoing measurement module 403 may be further configured to measure the at least one of the reference signal or the synchronization signal corresponding to the first network in a case that the first network is the network satisfying the first condition and the second network is the network satisfying the second condition.

Optionally, in the network switching apparatus 400 in this embodiment of this application, the foregoing measurement module 403 may be configured to: detect whether a first trigger condition is satisfied in a case that the first network is the network satisfying the first condition and the second network is the network satisfying the second condition; and measure the second signal in a case that the first trigger condition is satisfied. The first trigger condition includes at least one of: that first switching signaling transmitted by the first network is received by the terminal device, where the first switching signaling is used for indicating switching from the first network to the second network; that signal quality corresponding to the first network and measured by the terminal device is lower than a first signal quality threshold; that a channel occupancy rate COR corresponding to the first network and measured by the terminal device is higher than a first COR threshold; that a channel occupancy time COT corresponding to the first network and measured by the terminal device is higher than a first COT threshold; or that a scheduling request SR is transmitted by the terminal device.

Optionally, in the network switching apparatus 400 in this embodiment of this application, the foregoing measurement module 403 may be configured to: detect whether a second trigger condition is satisfied in a case that the first network is the network satisfying the second condition and the second network is the network satisfying the first condition; and measure the second signal in a case that the second trigger condition is satisfied. The second trigger condition includes at least one of: that second switching signaling transmitted by the first network is received by the terminal device, where the second switching signaling is used for indicating switching from the first network to the second network; that signal quality corresponding to the first network and measured by the terminal device is lower than a second signal quality threshold; that a channel occupancy rate COR corresponding to the first network and measured by the terminal device is higher than a second COR threshold; that a channel occupancy time COT corresponding to the first network and measured by the terminal device is higher than a second COT threshold; that an RRC connection release message transmitted by the first network is received by the terminal device; that the terminal device switches from a connected state to an idle state or an inactive state; or that the signal quality of the first network is higher than signal quality of the second network.

Optionally, in the network switching apparatus 400 in this embodiment of this application, the foregoing measurement module 403 may be configured to measure, in a case that there are a plurality of first signals corresponding to the first network, an intersection set or a union set of a plurality of second signals corresponding to the plurality of first signals, where the plurality of second signals are determined based on the plurality of first signals corresponding to the first network.

Optionally, in the network switching apparatus 400 in this embodiment of this application, a coverage range of the first network is wider than a coverage range of the second network.

Optionally, in the network switching apparatus 400 in this embodiment of this application, the first network is a control layer network or a sensing layer network, and the second network is a data layer network or a transport layer network.

Optionally, in the network switching apparatus 400 in this embodiment of this application, at least one of the following conditions is satisfied between the first network and the second network: that geographical areas are completely identical or partially identical; that the geographical areas completely overlap or partially overlap; that coverage areas are completely identical or partially identical; or that the coverage areas completely overlap or partially overlap.

Optionally, the network switching apparatus 400 in this embodiment of this application may further include a processing module, and the processing module is configured to perform at least one of: switching or reselecting from the first network to the second network, and completing downlink synchronization corresponding to the second network; or switching or reselecting from the first network to the second network, and completing at least one of system message reading or broadcast message reading corresponding to the second network.

Optionally, the network switching apparatus 400 in this embodiment of this application may further include a camping module, configured to camp on the first network before the second signal corresponding to the second network is determined according to the first signal corresponding to the first network.

In this embodiment of this application, in a process in which the terminal device switches from the first network to the second network associated with the first network, the terminal device may determine the second signal corresponding to the second network according to the first signal corresponding to the first network, and measure the second signal preferentially, where each of the first signal and the second signal may include at least the reference signal and/or the synchronization signal. In this way, a quantity of to-be-measured signals can be reduced and a measurement time can be shortened, thereby completing the switching from the first network to the second network more quickly and improving the network switching efficiency.

The network switching apparatus in this embodiment of this application may be an apparatus, or may be a component, an integrated circuit, or a chip in a terminal device. The apparatus may be a mobile terminal or a non-mobile terminal. For example, the mobile terminal may include, but is not limited to, the type of the terminal 11 listed above. The non-mobile terminal may be a server, a network attached storage (NAS), a personal computer (PC), a television (TV), a teller machine, a self-service machine, or the like, and this is not limited in this embodiment of this application.

The network switching apparatus in this embodiment of this application may be an apparatus having an operating system. The operating system may be an Android operating system, or may be an ios operating system, or may be another possible operating system. This is not limited in this embodiment of this application.

The network switching apparatus provided in this embodiment of this application can implement all processes implemented in the method embodiment of FIG. 2, and the same technical effect can be achieved. To avoid repetition, details are not described herein again.

Figure 5:
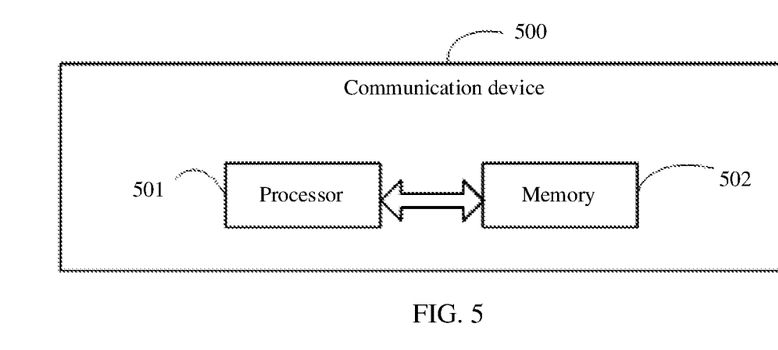
FIG. 5 is a schematic structural diagram of a communication device according to an embodiment of this application.

Optionally, as shown in FIG. 5, an embodiment of this application further provides a communication device 500, including a processor 501, a memory 502, and a program or an instruction stored in the memory 502 and executable on the processor 501. For example, in a case that the communication device 500 is a terminal device, when the program or the instruction is executed by the processor 501, all processes of the embodiments of the foregoing network switching method corresponding to FIG. 2 are implemented, and the same technical effect can be achieved. To avoid repetition, details are not described herein again.

Figure 6:
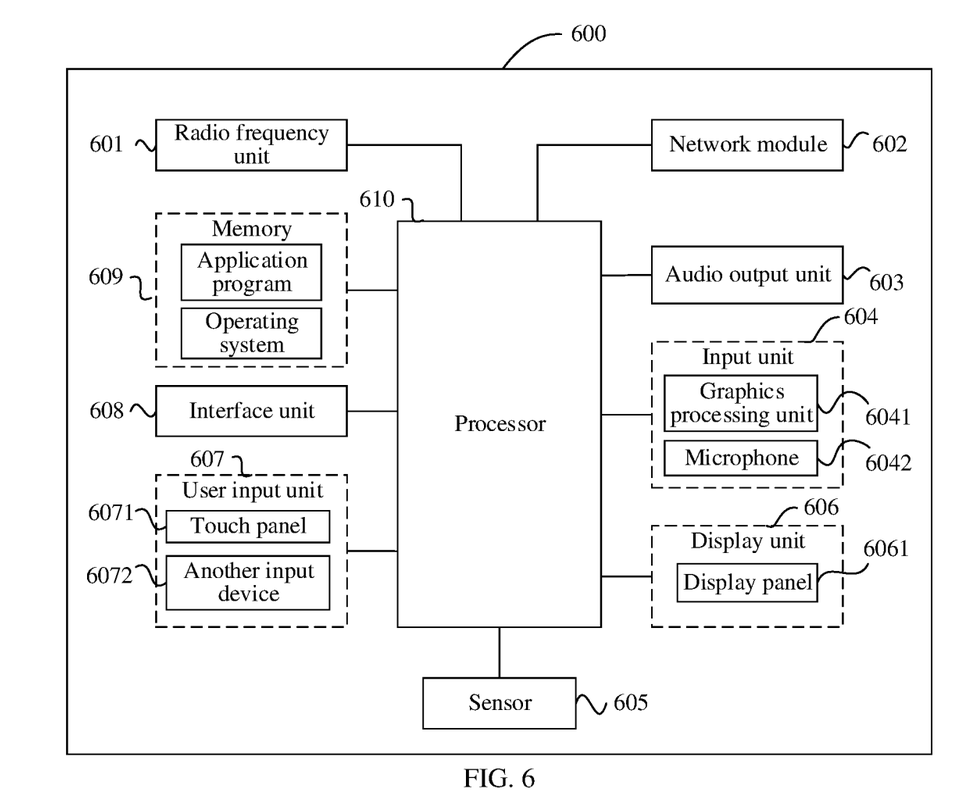
FIG. 6 is a schematic structural diagram of a terminal device according to an embodiment of this application.

FIG. 6 is a schematic diagram of a hardware structure of a terminal that implements the embodiments of this application.

A terminal 600 includes, but is not limited to, components such as a radio frequency unit 601, a network module 602, an audio output unit 603, an input unit 604, a sensor 605, a display unit 606, a user input unit 607, an interface unit 608, a memory 609, and a processor 610.

A person skilled in the art may understand that the terminal 600 may further include a power supply (such as a battery) for supplying power to the components. The power supply may be logically connected to the processor 610 by using a power supply management system, thereby implementing functions such as charging, discharging, and power consumption management by using the power supply management system. The terminal structure shown in FIG. 6 does not constitute a limitation on the terminal, and the terminal may include more or fewer components than those shown in the figure, or combine some components, or have different component arrangements. Details are not described herein again.

It should be understood that, in this embodiment of this application, the input unit 604 may include a graphics processing unit (GPU) 6041 and a microphone 6042. The graphics processing unit 6041 performs processing on image data of a static picture or a video that is obtained by an image acquisition apparatus (for example, a camera) in a video acquisition mode or an image acquisition mode. The display unit 606 may include a display panel 6061, and the display panel 6061 may be configured by using a liquid crystal display, an organic light-emitting diode, or the like. The user input unit 607 includes a touch panel 6071 and another input device 6072. The touch panel 6071 is also referred to as a touch screen. The touch panel 6071 may include two parts: a touch detection apparatus and a touch controller. The another input device 6072 may include, but is not limited to, a physical keyboard, a functional key (such as a volume control key or a switch key), a track ball, a mouse, and a joystick, and details are not described herein again.

In this embodiment of this application, the radio frequency unit 601 receives downlink data from a network side device and transmits the downlink data to the processor 610 for processing; and transmits uplink data to the network side device. Generally, the radio frequency unit 601 includes, but is not limited to, an antenna, at least one amplifier, a transceiver, a coupler, a low noise amplifier, a duplexer, and the like.

The memory 609 may be configured to store a software program or an instruction and various data. The memory 609 may mainly include a program storage area or an instruction storage area and a data storage area. The program storage area or the instruction storage area may store an operating system, an application program or an instruction required by at least one function (for example, a sound playback function and an image playback function), and the like. The memory 609 may include a high speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. For example, the memory may include at least one magnetic disk storage device, a flash memory device, or another volatile solid-state storage device.

The processor 610 may include one or more processing units. Optionally, the processor 610 may integrate an application processor and a modem processor. The application processor mainly processes an operating system, a user interface, an application program, an instruction, or the like. The modem processor mainly processes wireless communication such as a baseband processor. It may be understood that the foregoing modem processor may alternatively not be integrated into the processor 610.

The processor 610 is configured to: determine a second signal corresponding to a second network according to a first signal corresponding to a first network, where each of the first signal and the second signal includes at least one of a reference signal or a synchronization signal; and measure the second signal.

In this embodiment of this application, in a process in which the terminal device switches from the first network to the second network associated with the first network, the terminal device may determine the second signal corresponding to the second network according to the first signal corresponding to the first network, and measure the second signal preferentially, where each of the first signal and the second signal may include at least the reference signal and/or the synchronization signal. In this way, a quantity of to-be-measured signals can be reduced and a measurement time can be shortened, thereby completing the switching from the first network to the second network more quickly and improving the network switching efficiency.

An embodiment of this application further provides a non-transitory computer-readable storage medium, storing a program or an instruction. When the program or the instruction is executed by a processor, all processes of the embodiments of the foregoing network switching method are implemented, and the same technical effect can be achieved. To avoid repetition, details are not described herein again.

The processor is the processor in the terminal described in the foregoing embodiments. The non-transitory computer-readable storage medium includes a computer read-only memory (ROM), a random access memory (RAM), a magnetic disk, an optical disc, or the like.

An embodiment of this application further provides a computer program product, including a processor, a memory, and a program or an instruction stored in the memory and executable on the processor. When the program or the instruction is executed by the processor, all processes of the embodiments of the foregoing network switching method are implemented, and the same technical effect can be achieved. To avoid repetition, details are not described herein again.

An embodiment of this application further provides a chip, including: a processor and a communication interface, where the communication interface is coupled to the processor, and the processor is configured to execute a program or an instruction of a terminal device, to implement all processes of the embodiments of the foregoing network switching method, and the same technical effect can be achieved. To avoid repetition, details are not described herein again.

It should be understood that, the chip mentioned in this embodiment of this application may also be referred to as a system-level chip, a system chip, a chip system, a system on chip, or the like.

It should be noted that the terms "include", "comprise" or any other variation thereof in this specification are intended to cover a non-exclusive inclusion, so that a process, a method, an article, or an apparatus that includes a series of elements not only includes those elements but also includes other elements that are not expressly listed, or further includes elements inherent to such a process, a method, an article, or an apparatus. Unless otherwise specified, an element limited by "include a/an . . . " does not exclude other same elements existing in the process, the method, the article, or the apparatus that includes the element. In addition, it should be noted that within the scope of the method and apparatus in the implementations of this application, functions are not limited to be performed in an order shown or discussed, and may be performed according to the involved functions in a substantially simultaneous manner or in a reverse order. For example, the described method may be performed in an order different from the described order, and various steps may be added, omitted, or combined. In addition, features described with reference to some examples may also be combined in other examples.

Through the descriptions of the foregoing implementations, a person skilled in the art may clearly understand that the method according to the foregoing embodiments may be implemented by using software in combination with a necessary general hardware platform, and certainly, may alternatively be implemented by using hardware. Based on such an understanding, the technical solutions of this application essentially or the part contributing to the existing technology may be implemented in a form of a software product. The computer software product is stored in a storage medium (such as a read-only medium (ROM)/a random access memory (RAM), a magnetic disk, or an optical disc) and includes several instructions for instructing a terminal (which may be a mobile phone, a computer, a server, an air conditioner, a network device, or the like) to perform the methods described in the embodiments of this application.

The embodiments of this application have been described above with reference to the accompanying drawings. But this application is not limited to the embodiments described above, and the embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A network switching method, comprising:
   determining, by a terminal device, a second signal corresponding to a second network according to a first signal corresponding to a first network, wherein each of the first signal and the second signal comprises at least one of a reference signal or a synchronization signal; and
   measuring, by the terminal device, the second signal; wherein
   in a case that the first network is a network satisfying a first condition, the second network is a network satisfying a second condition; or
   in a case that the first network is a network satisfying the second condition, the second network is a network satisfying the first condition; wherein
   the first condition comprises at least one of: using single-frequency network (SFN) transmission, using a first frequency, having a first antenna height, or using first downlink transmit power; and
   the second condition comprises at least one of: using non-SFN transmission, using a second frequency, having a second antenna height, or using second downlink transmit power; wherein
   the first frequency is lower than the second frequency, the first antenna height is greater than the second antenna height, and the first downlink transmit power is lower than the second downlink transmit power.

2. The method according to claim 1, wherein the determining, by a terminal device, a second signal corresponding to a second network according to a first signal corresponding to a first network comprises:
   determining, by the terminal device, second information corresponding to the second signal according to first information corresponding to the first signal; and
   determining, by the terminal device, the second signal according to the second information; wherein
   each of the first information and the second information comprises at least one of: a cell identifier (ID), a transmission reception point (TRP) ID, synchronization signal and PBCH block (SSB) related information, channel state information reference signal (CSI-RS) related information, transmission configuration indicator (TCI) information, quasi co-location (QCL) information, or terminal device location related information.

3. The method according to claim 2, wherein the determining, by the terminal device, second information corresponding to the second signal according to first information corresponding to the first signal comprises:
acquiring, by the terminal device, the second information from a first mapping table according to the first information, wherein the first mapping table comprises a correspondence between the first information and the second information.

4. The method according to claim 3, wherein the first mapping table comprises one of:
a correspondence between the cell ID and the SSB related information corresponding to the second network and the SSB related information corresponding to the first network;
a correspondence between the SSB related information corresponding to the first network and the terminal device location related information, and a correspondence between the cell ID and the SSB related information corresponding to the second network and the terminal device location related information;
a correspondence between at least one of the cell ID or the SSB related information corresponding to the second network and the cell ID corresponding to the first network; or
a correspondence between at least one of the cell ID or the SSB related information corresponding to the second network and the TRP ID corresponding to the first network.

5. The method according to claim 3, wherein before the acquiring, by the terminal device, the second information from a first mapping table according to the first information, the method further comprises:
receiving, by the terminal device, first signaling transmitted by a network side device, wherein the first signaling carries the first mapping table and comprises radio resource control (RRC) signaling or broadcast signaling.

6. The method according to claim 2, wherein the determining, by the terminal device, second information corresponding to the second signal according to first information corresponding to the first signal comprises:
acquiring, by the terminal device, the second information from a second mapping table according to the terminal device location related information, wherein the second mapping table comprises a correspondence between the second information and the terminal device location related information.

7. The method according to claim 6, wherein the second mapping table comprises a correspondence between the cell ID and the SSB related information corresponding to the second network and the terminal device location related information.

8. The method according to claim 6, wherein before the acquiring, by the terminal device, the second information from a second mapping table according to the terminal device location related information, the method further comprises:
receiving, by the terminal device, second signaling transmitted by a network side device, wherein the second signaling carries the second mapping table and comprises radio resource control (RRC) signaling or broadcast signaling.

9. The method according to claim 2, wherein the SSB related information comprises at least one of:
a channel raster of an SSB;
a sync raster of the SSB;
time information of the SSB;
sequence related information of the SSB;
a quantity of SSBs;
an index of the SSB; or
time domain resource information of the SSB;
or
the CSI-RS related information comprises at least one of:
a period of a CSI-RS;
a duration of the CSI-RS;
an offset of the CSI-RS;
a code division multiplexing (CDM) type of the CSI-RS;
a quantity of ports of the CSI-RS;
a mode of the CSI-RS;
resource mapping of the CSI-RS;
density of the CSI-RS;
frequency domain resource information of the CSI-RS; or
a type of the CSI-RS.

10. The method according to claim 9, wherein the type of the CSI-RS comprises at least one of:
a CSI-RS for tracking;
a CSI-RS for calculating layer 1 reference signal received power;
a CSI-RS for mobility;
a zero power CSI-RS; or
a non-zero power CSI-RS.

11. The method according to claim 1, wherein in a case that the first network is the network satisfying the first condition and the second network is the network satisfying the second condition, the method further comprises:
measuring, by the terminal device, the at least one of the reference signal or the synchronization signal corresponding to the first network.

12. The method according to claim 1, wherein in a case that the first network is the network satisfying the first condition and the second network is the network satisfying the second condition, the measuring, by the terminal device, the second signal comprises:
detecting, by the terminal device, whether a first trigger condition is satisfied; and
measuring, by the terminal device, the second signal in a case that the first trigger condition is satisfied; wherein the first trigger condition comprises at least one of:
that first switching signaling transmitted by the first network is received by the terminal device, wherein the first switching signaling is used for indicating switching from the first network to the second network;
that signal quality corresponding to the first network and measured by the terminal device is lower than a first signal quality threshold;
that a channel occupancy rate (COR) corresponding to the first network and measured by the terminal device is higher than a first COR threshold;
that a channel occupancy time (COT) corresponding to the first network and measured by the terminal device is higher than a first COT threshold; or
that a scheduling request (SR) is transmitted by the terminal device.

13. The method according to claim 1, wherein in a case that the first network is the network satisfying the second condition and the second network is the network satisfying the first condition, the measuring, by the terminal device, the second signal comprises:
detecting, by the terminal device, whether a second trigger condition is satisfied; and
measuring, by the terminal device, the second signal in a case that the second trigger condition is satisfied; wherein the second trigger condition comprises at least one of:
that second switching signaling transmitted by the first network is received by the terminal device, wherein the second switching signaling is used for indicating switching from the first network to the second network;
that signal quality corresponding to the first network and measured by the terminal device is lower than a second signal quality threshold;
that a channel occupancy rate (COR) corresponding to the first network and measured by the terminal device is higher than a second COR threshold;
that a channel occupancy time (COT) corresponding to the first network and measured by the terminal device is higher than a second COT threshold;
that a radio resource control (RRC) connection release message transmitted by the first network is received by the terminal device;
that the terminal device switches from a connected state to an idle state or an inactive state; or
that the signal quality of the first network is higher than signal quality of the second network.

14. The method according to claim 1, wherein in a case that there are a plurality of first signals corresponding to the first network, the measuring, by the terminal device, the second signal comprises:
measuring, by the terminal device, an intersection set or a union set of a plurality of second signals corresponding to the plurality of first signals; wherein
the plurality of second signals are determined based on the plurality of first signals corresponding to the first network.

15. The method according to claim 1, wherein at least one of following conditions is satisfied between the first network and the second network:
that geographical areas are completely identical or partially identical;
that the geographical areas completely overlap or partially overlap;
that coverage areas are completely identical or partially identical; or
that the coverage areas completely overlap or partially overlap.

16. The method according to claim 1, further comprising at least one of:
switching or reselecting, by the terminal device, from the first network to the second network, and completing downlink synchronization corresponding to the second network; or
switching or reselecting, by the terminal device, from the first network to the second network, and completing at least one of system message reading or broadcast message reading corresponding to the second network.

17. The method according to claim 1, wherein before the determining, by a terminal device, a second signal corresponding to a second network according to a first signal corresponding to a first network, the method further comprises:
camping, by the terminal device, on the first network.

18. A terminal device, comprising a processor, a memory, and a program or an instruction stored in the memory and executable on the processor, wherein the program or the instruction, when executed by the processor, causes the terminal device to perform:
determining a second signal corresponding to a second network according to a first signal corresponding to a first network, wherein each of the first signal and the second signal comprises at least one of a reference signal or a synchronization signal; and
measuring the second signal; wherein
in a case that the first network is a network satisfying a first condition, the second network is a network satisfying a second condition; or
in a case that the first network is a network satisfying the second condition, the second network is a network satisfying the first condition; wherein
the first condition comprises at least one of: using single-frequency network (SFN) transmission, using a first frequency, having a first antenna height, or using first downlink transmit power; and
the second condition comprises at least one of: using non-SFN transmission, using a second frequency, having a second antenna height, or using second downlink transmit power; wherein
the first frequency is lower than the second frequency, the first antenna height is greater than the second antenna height, and the first downlink transmit power is lower than the second downlink transmit power.

19. A non-transitory computer-readable storage medium, storing a program or an instruction, wherein the program or the instruction, when executed by a processor, causes the processor to perform:
determining a second signal corresponding to a second network according to a first signal corresponding to a first network, wherein each of the first signal and the second signal comprises at least one of a reference signal or a synchronization signal; and
measuring the second signal; wherein
in a case that the first network is a network satisfying a first condition, the second network is a network satisfying a second condition; or
in a case that the first network is a network satisfying the second condition, the second network is a network satisfying the first condition; wherein
the first condition comprises at least one of: using single-frequency network (SFN) transmission, using a first frequency, having a first antenna height, or using first downlink transmit power; and
the second condition comprises at least one of: using non-SFN transmission, using a second frequency, having a second antenna height, or using second downlink transmit power; wherein
the first frequency is lower than the second frequency, the first antenna height is greater than the second antenna height, and the first downlink transmit power is lower than the second downlink transmit power.

* * * * *